Patented May 23, 1944

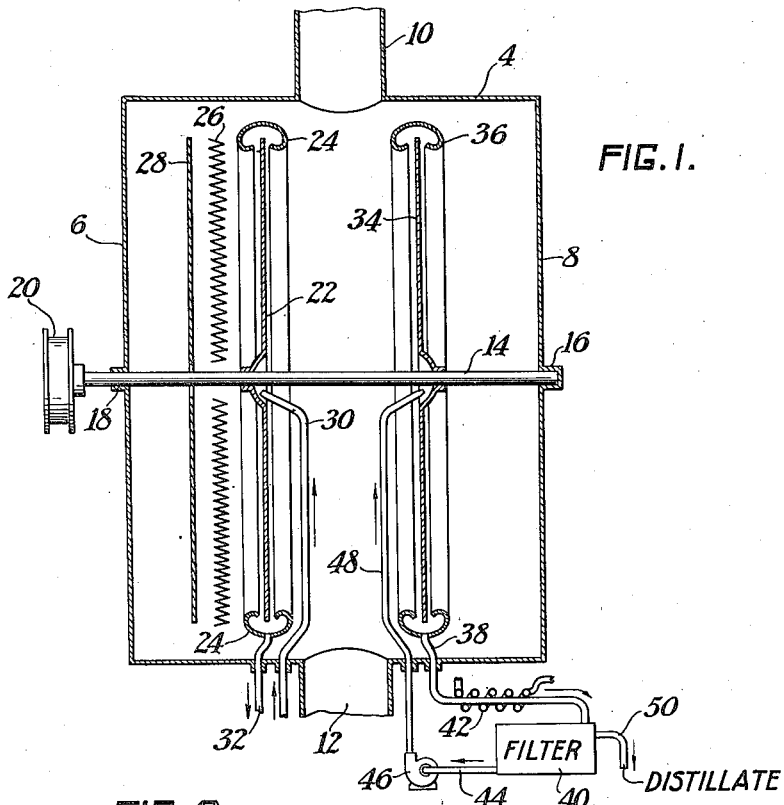
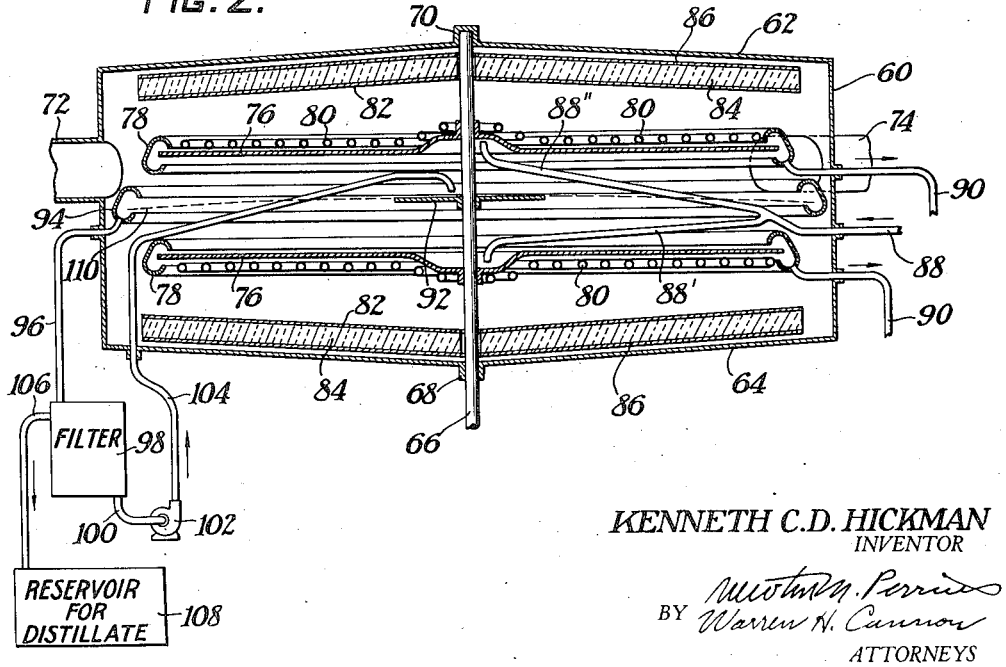

2,349,431

UNITED STATES PATENT OFFICE 2,349,431

DISTILLATION APPARATUS

Kenneth C. D. Hickman, Rochester, N. Y., assignor to Distillation Products, Inc., Rochester, N. Y., a corporation of Delaware Application May 22, 1940, Serial No. 336,563

8 Claims. (Cl. 202—205)

This invention relates to improved high vacuum distillation apparatus in which the condensing and vaporizing zones or surfaces are separated by substantially unobstructed space.

It is well known that the thermal efficiency of high vacuum, unobstructed path distillation apparatus is exceedingly low. This is because the hot evaporating surface is of approximately the same area as the cold condensing surface so that enormous losses of heat takes place from the vaporizing surface to the condensing surface. The maximum thermal efficiency in stills of this type is approximately 10–12%. In Patent 1,905,201 it has been proposed to employ highly polished baffles between the vaporizing condensing surfaces in order to reflect the heat back to the vaporizing surface. It is also suggested that the condensing surface be highly polished. In both suggestions the material is caused to flow over the surface by gravity.

I have tested these suggestions and found that they are not a satisfactory solution of the problem of heat loss. The baffles between the two surfaces obstruct distillation and become coated with organic matter which becomes charred due to the high temperature. Furthermore such expedients do not take into account the true causes of heat loss from surface evaporators.

This invention has for its object to provide high vacuum unobstructed path distillation apparatus in which the thermal efficiency is substantially improved. Another object is to provide high vacuum unobstructed path distillation apparatus having substantially reduced heat losses. Other objects are to improve the state of the art. Further objects will become apparent from the following description and claims.

I have discovered, in accordance with my invention, that the foregoing objects can be accomplished by employing a polished condensing surface and maintaining the film of condensate thereon so thin that it does not substantially absorb heat from the vaporizing surface. I have found that the film of distilland and condensate are opaque to heat in the film thicknesses ordinarily encountered in gravity flow stills. However, I have discovered that, if the film thickness is sufficiently reduced, the distilland is transparent to heat radiation. By maintaining the film of condensate at the required value of thickness I have found that the heat radiated from the vaporizing surface passes therethrough without being absorbed and is then reflected back to the vaporizing surface by the polished condenser. In the constructions heretofore employed the film thickness was sufficiently large that the radiated heat was substantially absorbed by the film of condensate and, therefore, could not be radiated back to the vaporizing surface by the polished condensing surface.

The reduction of heat losses can be further improved by applying the same procedure to the vaporizing surface. Thick films of distilland radiate heat. Thin films are relatively transparent to heat. Therefore, if the vaporizing surface is highly polished, it will not radiate heat and if the film of distilland thereon is sufficiently thin, it likewise will not radiate heat. Consequently the heat loss due to radiation is markedly reduced. It will be understood that my invention resides in the discovery that the heat losses are due to the fact that organic liquids on the vaporizing or condensing surfaces are not transparent to heat except in very thin films and that the use of such thin films in connection with appropriate radiating surfaces is a part of my invention whether applied to the vaporizing surface alone, the condensing surface alone, or to both surfaces. I include within the scope of my invention those film thicknesses which absorb or radiate substantially less heat than would be absorbed or radiated by a film of the same material flowing under gravitational restraint.

In the accompanying drawing I have illustrated two of the preferred embodiments of my invention, wherein:

Fig. 1 illustrates in vertical section a still comprising a rotating vaporizing plate and an opposite rotating condensing plate, both plates being highly polished and being capable of maintaining distilland and distillate in films substantially thinner than obtained by gravity, and:

Fig. 2 is a vertical section of a modification of Fig. 1, in which the heat losses are still further reduced by a construction which permits heat radiated from one vaporizing surface to be adsorbed by an opposite vaporizing surface.

Referring to Fig. 1, reference numeral 4 designates a cylindrical still casing provided with end plates 6 and 8. Numerals 10 and 12 designate evacuating conduits connected to vacuum pumps (not shown). Numeral 14 designates a shaft housed in bearings 16 and 18 in a gas-tight manner. Numeral 20 designates a pulley integral with shaft 14. Numeral 22 designates a circular vaporizing plate integral with shaft 14, the periphery of which extends into annular gutter 24. Numeral 26 designates an electrical resistance heating unit, and numeral 28 designates a highly polished reflector. Numeral 30 designates a conduit which terminates in the depressed central portion of plate 22 and serves to introduce distilland thereon. Numeral 32 designates a conduit which connects to the bottom portion of annular gutter 24 and serves to withdraw liquid therefrom. Numeral 34 designates a vertical circular plate, the periphery of which extends into annular gutter 36. Numeral 38 designates a conduit connected to the lower part of gutter 36 which serves to withdraw liquid collecting therein and deliver it to filter 40. Numeral 42 designates a cooling coil which serves to cool liquid flowing through conduit 38. Numeral 44 designates a conduit through which filtered liquid is withdrawn by pump 46 and delivered onto the depressed central portion of plate 34 by conduit 48. Numeral 50 designates a conduit through which excess liquid from filter 40 is withdrawn into a suitable vacuum storage tank.

Referring to Fig. 2, numeral 60 designates a cylindrical still casing provided with end plates 62 and 64. Numeral 66 designates a shaft located in the approximate center of plates 62 and 64 and housed in a gas-tight manner by bearings 68 and 70. Numerals 72 and 74 designate evacuating conduits which connect to vacuum pumps (not shown).

Numeral 76 designates two circular, oppositely facing, vaporizing plates integral with shaft 66. The peripheries of the plates extend into gutters 78. The plates are heated to distillation temperature by radiation from heating coils 80. Numeral 82 designates a highly polished reflector placed immediately back of each of the vaporizing plates 76. Numeral 84 designates a heat reflecting, non-conducting filling. Numeral 86 designates a highly polished reflecting surface. Numeral 88 designates a conduit through which distilland is introduced onto the central depressed portions of the vaporizing surfaces by branches 88' and 88". Numeral 90 designates conduits through which liquid collecting in gutters 78 is withdrawn from the still. Numeral 92 designates a plate integral with shaft 66 located between the two vaporizing plates 76 and of substantially smaller diameter than the plates 76. Numeral 94 designates an annular gutter which is located so that its open portion is approximately horizontal with the edge of plate 92. Numeral 96 designates a conduit through which liquid collecting in gutter 94 is withdrawn and delivered to filter 98. Numeral 100 designates a conduit through which filtered liquid is withdrawn by means of pump 102 and is delivered onto the center of plate 92 by way of conduit 104. Numeral 106 designates a conduit through which excess liquid overflows from filter 98 and is collected in reservoir 108.

In operating the apparatus illustrated in Fig. 1, the system is evacuated through evacuating conduits 10 and 12. Plates 22 and 34 are caused to rotate and heating element 26 is put into operation. Radiation from this element causes plate 22 to be heated to distillation temperature. Liquid to be distilled, and preferably in a degassed condition, is introduced onto the center of rotating plate 22 by way of conduit 30. This liquid is spun by centrifugal force in a thin film over the surface of plate 22 which, being heated, causes vaporization. The centrifugal action causes the film to be of exceedingly small thickness and, since vaporizing plate 22 is highly polished, little heat loss takes place by radiation from the polished plate or from the very thin film. Undistilled residue is thrown from the periphery of plate 22 into gutter 24 and is withdrawn by way of conduit 32. Vapors derived from the distilling film pass to the condensing surface 34. Liquid condensate is thrown by centrifugal force into gutter 36, is withdrawn through conduit 38 and is cooled by cooling coil 42 in order to precipitate solids. The cooled liquid is then filtered in filter 40 and is introduced onto the center of the condensing plate 34 by pump 46 and conduit 48. This reintroduced cool filtered condensate is then spun by centrifugal force in a very thin film over plate 34. This cycle is repeated during the distillation. Excess condensate is withdrawn through conduit 50.

The cool condensate introduced onto plate 34 maintains it at a satisfactory low condensing temperature. Since plate 34 is highly polished it does not absorb heat which might be radiated from plate 22. Likewise, since the film of cool condensate thereon is of exceedingly small thickness, it does not absorb substantial amounts of heat which might be radiated from plate 22.

The vaporizing surface is also highly polished and therefore radiates little heat. The same is true of the very thin film of distilland.

In operating the apparatus shown in Fig. 2, the system is evacuated through conduits 72 and 74. Vaporizing plates 76 are heated by operation of heating coils 80. Plates 76 and 92 are caused to rotate at relatively high speed by force applied through shaft 66. Distilland is introduced through conduits 88 onto the centers of plates 76. The distilland flows by centrifugal force over these vaporizing plates in a thin film. These plates are highly polished and, due to the thinness of the film, little radiation takes place. Vapors condense on plate 92 and are thrown as a thin curtain into gutter 94. This condensate flows through conduit 96 into filter 98 in which it is filtered and preferably permitted to cool. The condensate is then withdrawn by pump 102 and delivered onto the center of plates 92 by conduit 104. This cool filtered condensate is then thrown in the form of a very thin curtain by centrifugal force into gutter 94. This cycle is repeated during the distillation and excess condensate is withdrawn through conduit 106 into reservoir 108.

Vapors derived from vaporizing plates 76 pass into contact with the film of condensate illustrated by dotted line 110. This condensate is cool and the vapors condense thereon and are carried by the inertia of the film into gutter 94. Since plates 76 are highly polished and the film of distilland thereon is of small thickness, little radiation takes place. However, the advantage of this construction is that any radiation which does take place passes through the heat transparent film 110 and is picked up by the oppositely facing vaporizing plate 76 where the heat is efficiently utilized.

It has been found that a reflector 28, such as shown in Fig. 1, gets hot and acquires a coating of distilland or distillate soon after distillation starts. This coating gradually chars due to the high temperature of plate 28 and consequently the efficiency of the reflecting surface gradually diminishes. This disadvantage is largely overcome by the reflecting construction shown in Fig. 2 wherein an insulating filling 84 is sandwiched between two highly polished reflecting surfaces 82 and 86. While surface 82 gradually becomes covered with charred material, the filling 84 prevents polished surface 86 from coming to a high temperature. Therefore surface 86 remains at a low temperature, retains its reflecting surface, and efficiently reflects heat back to the vaporizing surfaces 76 where it is utilized. The filling is preferably of a material which does not evolve gases in a high vacuum for a considerable period of time. Materials such as glass wool, rock wool, or crumpled aluminum foil, are satisfactory. Magnesium, titanium and other white oxides are excellent after the first evolution of gas has subsided. It is to be understood that the use of such reflectors is preferable, but not necessary, and that my invention is not restricted to the use of such modifications.

The speed of rotation can be varied to suit conditions as a general rule speeds of about 300 to 50,000 R. P. M. are useful. Speeds of about 1,000 to 4,000 are most generally employed. For further details regarding centrifugal still construction I refer to my application No. 99,632 filed September 5, 1936.

The highly polished surfaces, and particularly those employed for condensing or vaporizing should be constructed of materials which will retain a polish for a considerable period of time. In connection with the vaporizing surface, it should be of a material which will retain a polish while at a high temperature. However, since the system is maintained under a high vacuum, oxidation is not a particular problem. Highly polished metals are preferred and metals such as steel, nickel, stainless steel, silver and the like, have been found to be particularly useful.

While I have illustrated my invention by means of thin films produced by centrifugal force, it will be realized that the same results can be accomplished by means of sprays or jets in which the distilland is dispersed or attenuated. Likewise, traveling gauzes, bands or drums in which distilland is disposed in very thin films can be employed.

It will be realized that in connection with Fig. 2, the use of highly polished vaporizing plates is not so important because any heat which is radiated is picked up by oppositely facing vaporizing surfaces. However, it is essential that the film of condensate therebetween be sufficiently thin that it does not absorb a substantial amount of the radiated heat.

The most important surface to keep bright is the condenser. The distilling surface may become dirty during distillation because of gradual accumulation of charred material. Therefore, it gradually radiates more heat. On the other hand, it is also more receptive to heat reflected back from the condenser. However, if the condenser is non-reflecting, the change in emissivity of the distilling surface can cause great adsorption of heat on the condensing surface and result in serious inefficiency.

The thermal efficiency of the conventional type of pot or column still is quite high. The condensing and vaporizing portions thereof are rather widely separated and heat loss from one to the other is negligible except for the heat actually carried by the vapors. Radiation in such a still is not an important factor. In the high vacuum, unobstructed path type of still exactly the opposite situations exist. Great loss by radiation between the vaporizing and condensing surfaces takes place and it is not feasible to introduce insulating material therebetween without altering the type of distillation. My invention has the decided advantage that these heat losses are reduced to a low value without affecting the distillation in any undesirable manner.

This application is a continuation in part of my application No. 99,632 filed September 5, 1936, now Patent 2,210,927, dated August 13, 1940.

What I claim is:

1. High vacuum distillation apparatus comprising vaporizing and condensing surfaces separated by substantially unobstructed space characterized by a highly polished metal, heat reflecting condensing surface and means for maintaining condensate thereon in a film of sufficient thinness that the condensate will absorb substantially less heat than would be absorbed by a film of the same condensate draining from a vertical surface by gravitational flow.

2. High vacuum distillation apparatus comprising vaporizing and condensing surfaces separated by substantially unobstructed space characterized by a heat reflecting metal condensing surface which has a high polish and means for maintaining condensate thereon in a film of sufficient thinness that the condensate will absorb substantially less heat than would be absorbed by a film of the same condensate draining from a vertical condensing surface by gravitational flow, and by a heat reflecting metal vaporizing surface which has a high polish and means for maintaining distilland thereon in a film of sufficient thinness that the distilland will radiate substantially less heat than would be radiated by the same distilland draining from a vertical vaporizing surface by gravitational flow.

3. High vacuum distillation apparatus comprising vaporizing and condensing surfaces separated by substantially unobstructed space characterized by a highly polished metal, heat reflecting condensing surface, means for recirculating condensate over the condensing surface and means for maintaining condensate on the condensing surface in a film of sufficient thinness that the condensate will absorb substantially less heat than would be absorbed by a film of the same condensate draining from a vertical condensing surface by gravitational flow.

4. High vacuum distillation apparatus comprising vaporizing and condensing surfaces separated by substantially unobstructed space characterized by a highly polished metal, heat reflecting rotatable condensing surface and means for rotating the condensing surface whereby during operation the condensate is maintained, by centrifugal force, in a film of sufficient thinness that the condensate will absorb substantially less heat than would be absorbed by a film of the same condensate draining from a vertical condensing surface by gravitational flow.

5. High vacuum distillation apparatus comprising vaporizing and condensing surfaces separated by substantially unobstructed space characterized by highly polished metal, heat reflecting, rotatable vaporizing and condensing surfaces and means for rotating them whereby the distilland and condensate are maintained, by centrifugal force, in films of sufficient thinness that the distilland radiates relatively little heat and the condensate absorbs relatively little of the radiated heat.

6. High vacuum distillation apparatus comprising vaporizing and condensing surfaces separated by substantially unobstructed space, characterized by a highly polished metal, heat reflecting rotatable condensing surface, means for recirculating cooled and filtered condensate onto the condensing surface and means for rotating the condensing surface whereby during operation the condensate is maintained by centrifugal force, in a film of such thinness that the condensate will absorb relatively little of the heat radiated from the vaporizing surface.

7. High vacuum distillation apparatus comprising vaporizing and condensing zones separated by substantially unobstructed space characterized by oppositely facing vaporizing surfaces, and means for maintaining a film of cool condensate therebetween which is of sufficient thinness that the film of condensate will absorb substantially less heat than would be absorbed by a film of the same condensate draining from a vertical condensing surface by gravitational flow.

8. High vacuum distillation apparatus comprising vaporizing and condensing zones separated by substantially unobstructed space characterized by oppositely facing, rotatable and brightly polished vaporizing surfaces, means for introducing distilland onto the approximate center of the vaporizing surfaces means for rotating the vaporizing surfaces whereby during operation distilland introduced near the center thereof is caused to pass thereover by centrifugal force in films of sufficient thinness that relatively little heat is radiated thereby, a rotatable surface between the two vaporizing surfaces and of smaller diameter for maintaining a film of recycled cool condensate between the two vaporizing surfaces which film is of such thinness that it will absorb relatively little heat radiated from the vaporizing surfaces and means for introducing distillate onto the approximate center of the smaller intermediate rotatable surface.

KENNETH C. D. HICKMAN.